(12) United States Patent
Wu et al.

(10) Patent No.: US 12,445,224 B2
(45) Date of Patent: Oct. 14, 2025

(54) DATA TRANSMISSION METHOD AND APPARATUS, DEVICE, AND MEDIUM

(71) Applicant: Beijing Bytedance Network Technology Co., Ltd., Beijing (CN)

(72) Inventors: Canrui Wu, Beijing (CN); Wei Zhang, Beijing (CN); Xuefeng Tao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/713,581

(22) PCT Filed: Nov. 28, 2022

(86) PCT No.: PCT/CN2022/134627
§ 371 (c)(1),
(2) Date: May 24, 2024

(87) PCT Pub. No.: WO2023/093879
PCT Pub. Date: Jun. 1, 2023

(65) Prior Publication Data
US 2025/0015924 A1  Jan. 9, 2025

(30) Foreign Application Priority Data
Nov. 26, 2021 (CN) .......................... 202111424223.7

(51) Int. Cl.
*H04L 1/00* (2006.01)
*H04L 65/60* (2022.01)

(52) U.S. Cl.
CPC ............ *H04L 1/0045* (2013.01); *H04L 65/60* (2013.01)

(58) Field of Classification Search
CPC ............................ H04L 1/0045; H04L 65/60
See application file for complete search history.

(56) References Cited

U.S. PATENT DOCUMENTS 9,094,663 B1 * 7/2015 Paniconi .............. H04N 19/188
2003/0212943 A1 11/2003 Zhang
(Continued)

FOREIGN PATENT DOCUMENTS

| CN | 108667563 A | 10/2018 |
|---|---|---|
| CN | 108781139 A | 11/2018 |

(Continued)

OTHER PUBLICATIONS

"Evaluation of Multicast Error Recovery Using Convolutional Codes"—Yamaguchi et al., 0-7695-0975-4/00 $10.00 0 2000 IEEE (Year: 2000).*

(Continued)

*Primary Examiner* — Mainul Hasan
(74) *Attorney, Agent, or Firm* — Astute IP Law Group

(57) ABSTRACT

The present disclosure discloses a data transmission method and apparatus, a device, and a medium. The method includes: determining a maximum number of retransmissions of a first target number of media packets; determining a minimum configured number of FEC redundant packets based on the maximum number of retransmissions, a preset recovery probability, and a predetermined reception probability of data packets; and sending, to a receiving end, the first target number of media packets and the minimum configured number of FEC redundant packets.

18 Claims, 3 Drawing Sheets

(56) References Cited

U.S. PATENT DOCUMENTS

| | | | |
|---|---|---|---|
| 2007/0079222 A1 | 4/2007 | Kure et al. | |
| 2008/0222494 A1* | 9/2008 | Gondo | H04L 1/1835 714/776 |
| 2010/0005360 A1 | 1/2010 | Begen et al. | |
| 2010/0165830 A1* | 7/2010 | Amir | H04L 45/04 370/216 |
| 2011/0219287 A1* | 9/2011 | Srinivas | H04L 47/193 714/752 |
| 2012/0278677 A1* | 11/2012 | Kure | H04L 1/1816 714/751 |
| 2014/0269359 A1* | 9/2014 | Roskind | H04L 43/0882 370/252 |
| 2017/0063497 A1* | 3/2017 | Paniconi | H03M 13/356 |
| 2018/0167162 A1* | 6/2018 | Whitwell | H04L 43/0835 |
| 2018/0205395 A1 | 7/2018 | Nammi | |
| 2019/0158228 A1* | 5/2019 | Wang | H04L 43/0829 |
| 2020/0044787 A1* | 2/2020 | Wang | H04L 1/0041 |
| 2020/0099981 A1* | 3/2020 | Zhang | H04N 21/647 |

FOREIGN PATENT DOCUMENTS

| | | |
|---|---|---|
| CN | 109525458 A | 3/2019 |
| CN | 109951254 A | 6/2019 |
| CN | 110247736 A | 9/2019 |
| CN | 110855400 A | 2/2020 |
| CN | 112187817 A | 1/2021 |
| CN | 112804028 A | 5/2021 |
| CN | 114039703 A | 2/2022 |
| JP | 3757857 B2 * | 3/2006 .......... H04L 65/756 |
| WO | 2006060036 A1 | 6/2006 |
| WO | 2011091769 A | 8/2011 |
| WO | 2017157303 A1 | 9/2017 |
| WO | WO-2021159641 A1 * | 8/2021 .............. H04L 1/18 |

OTHER PUBLICATIONS

"Optimizing FEC Transmission Strategy for Minimizing Delay in Lossless Sequential Streaming"—Mehrotra et al., IEEE Transactions on Multimedia, vol. 13, No. 5, Oct. 2011 (Year: 2011).*

"Score-Based Packet Retransmission Approach for Push-Pull P2P Streaming Systems"—Sayit et al., Proceedings of the 2013 Federated Conference on Computer Science and Information Systems pp. 627-633 (Year: 2013).*

International Search Report for PCT/CN2022/134627, mailed Feb. 12, 2023, 3 pages.

Search report for Chinese Patent Application No. 202111424223.7, mailed Jul. 6, 2023, 2 pages.

Supplementary Search report for Chinese Patent Application No. 202111424223.7, 2 pages.

* cited by examiner

DATA TRANSMISSION METHOD AND APPARATUS, DEVICE, AND MEDIUM

The present application is a national stage application filed under 35 U.S.C. 371 based on International Patent Application No. PCT/CN2022/134627, filed Nov. 28, 2022, which claims priority to Chinese Patent Application No. 202111424223.7, filed with the China National Intellectual Property Administration on Nov. 26, 2021, the disclosures of which are incorporated herein by reference in their entireties.

TECHNICAL FIELD

The present disclosure relates to the field of data processing, and for example, to a data transmission method and apparatus, a device, and a medium.

BACKGROUND ART

Due to a complex network environment of users and extreme requirements of the users for real-time experience, the real-time communication (RTC) technology inevitably requires weak network countermeasure.

Currently, there are two strategies for weak network countermeasure for RTC, including: a forward error correction (FEC) technology (that is, a sender sends redundant messages in advance to perform weak network countermeasure) and a non-acknowledge (NACK) technology (that is, a receiver feeds, when discovering a packet loss, packet loss information back to the sender through NACK, to request the sender to retransmit a lost message). Generally, a higher FEC redundancy proportion indicates a stronger active anti-packet loss capability, and thus a smaller number of retransmissions is required, resulting in a lower delay. However, when FEC is not used to recover lost packets, a waste of network resources may be caused, and operating costs are increased. In addition, given a certain bandwidth, an excessively high FEC proportion may reduce the media core code rate, affecting the clarity and frame rate of real-time communication. Therefore, how to reduce the FEC redundancy proportion and reduce operating costs while satisfying the requirements of users for the delay and weak network resistance is particularly important.

SUMMARY OF THE INVENTION

Embodiments of the present disclosure provide a data transmission method and apparatus, a device, and a medium, which reduce the FEC redundancy proportion while satisfying resistance and delay requirements of users, thereby improving video clarity and reducing operating costs.

According to a first aspect, an embodiment of the present disclosure provides a data transmission method. The data transmission method includes:
  determining a maximum number of retransmissions of a first target number of media packets;
  determining a minimum configured number of FEC redundant packets based on the maximum number of retransmissions, a preset recovery probability, and a predetermined reception probability of data packets; and
  sending, to a receiving end, the first target number of media packets and the minimum configured number of FEC redundant packets.

According to a second aspect, an embodiment of the present disclosure further provides a data transmission apparatus. The data transmission apparatus includes:
  a first determination module configured to determine a maximum number of retransmissions of a first target number of media packets;
  a second determination module configured to determine a minimum configured number of FEC redundant packets based on the maximum number of retransmissions, a preset recovery probability, and a predetermined reception probability of data packets; and
  a sending module configured to send, to a receiving end, the first target number of media packets and the minimum configured number of FEC redundant packets.

According to a third aspect, an embodiment of the present disclosure further provides an electronic device. The electronic device includes:
  at least one processor; and
  a memory configured to store at least one program, where the at least one program, when executed by the at least one processor, causes the at least one processor to implement the data transmission method as described in any one of the above embodiments.

According to a fourth aspect, an embodiment of the present disclosure further provides a computer storage medium storing a computer program that, when executed by a processor, causes the data transmission method as described in any one of the above embodiments to be implemented.

BRIEF DESCRIPTION OF DRAWINGS

Throughout the drawings, the same or similar reference numerals denote the same or similar elements. It should be understood that the accompanying drawings are schematic and that parts and elements are not necessarily drawn to scale.

DETAILED DESCRIPTION OF THE INVENTION

Embodiments of the present disclosure are described in more detail below with reference to the accompanying drawings.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "at least one".

The names of messages or information exchanged between a plurality of apparatuses in the implementations of the present disclosure are used for illustrative purposes only, and are not used to limit the scope of these messages or information.

Figure 1:
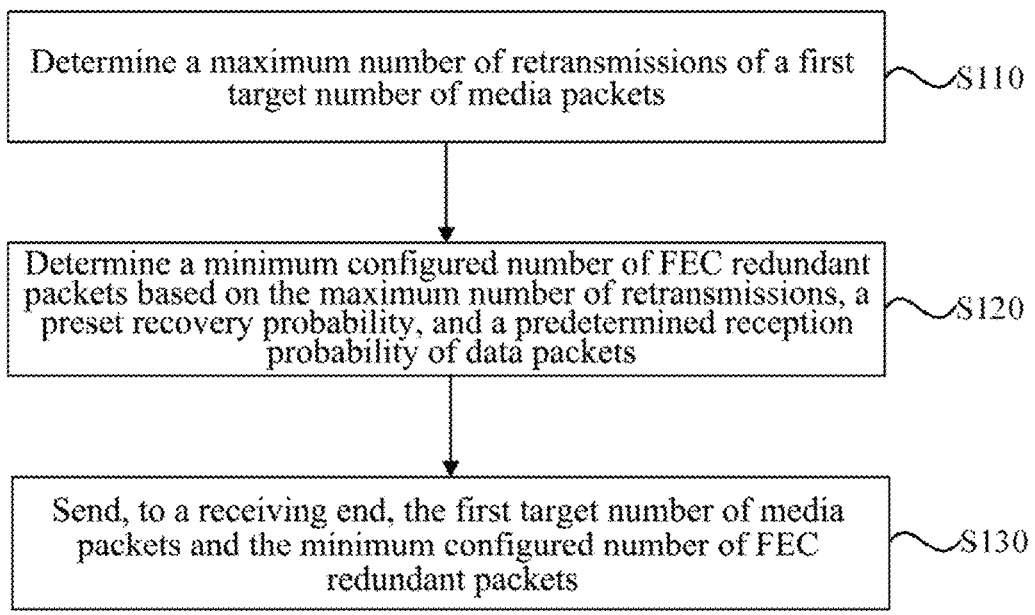
FIG. 1 is a flowchart of a data transmission method according to an embodiment of the present disclosure.

FIG. 1 is a flowchart of a data transmission method according to an embodiment of the present disclosure. The method may be performed by a data transmission apparatus configured in an electronic device. This embodiment is applied to a scenario of weak network countermeasure for RTC communication. The electronic device may be a sending end, and optionally may be a smart terminal that can transmit a video, such as a smart phone, an iPad, or a personal computer (PC). As shown in FIG. 1, the method in this embodiment includes the following steps.

S110: Determine a maximum number of retransmissions of a first target number of media packets.

The maximum number of retransmissions refers to a maximum number of times a sending end can retransmit media packets to a receiving end. It should be noted that the first time that the sending end sends the media packets to the receiving end is not included in the maximum number of retransmissions, that is, the maximum number of retransmissions is a total number of transmissions minus 1. It may be understood that the sending end generates the first target number of media packets in advance, and numbers each media packet, that is, each media packet corresponds to one media packet sequence number. Then, the sending end sends the first target number of media packets to the receiving end. If the receiving end fails to successfully receive the first target number of media packets, the receiving end feeds back to the sending end a media packet sequence number corresponding to an unsuccessfully received media packet, such that the sending end retransmits the media packet corresponding to the media packet sequence number (that is, the media packet sequence number corresponding to the media packet that was not successfully received by the receiving end). Certainly, the sending end may also retransmit the first target number of media packets to the receiving end, which is not limited.

In an embodiment, for different network conditions between the sending end and the receiving end, there are different service transmission scenarios. In order to ensure normal communication between the sending end and the receiving end, a maximum number of retransmissions of media packets may be adaptively configured depending on the service transmission scenarios and/or the network conditions. The maximum number of retransmissions of the media packets may be the maximum number of retransmissions of the first target number of media packets, or may be a maximum number of retransmissions of some of the first target number of media packets.

S120: Determine a minimum configured number of FEC redundant packets based on the maximum number of retransmissions, a preset recovery probability, and a predetermined reception probability of data packets.

In an embodiment, the preset recovery probability refers to a probability that the receiving end can successfully recover data packets, which may also be understood as a probability that the receiving end can successfully receive the data packets. It should be understood that the reception probability of data packets at the receiving end is greater than or equal to the preset recovery probability, that is, the probability that the receiving end successfully parses out data information corresponding to the data packets is greater than or equal to the preset recovery probability.

In an embodiment, the reception probability of data packets (that is, the predetermined reception probability of data packets in S120) may be determined based on the maximum number of retransmissions and the first target number. For the method for determining the reception probability of data packets, see S230 of the present application. Then, the minimum configured number of FEC redundant packets is determined based on the reception probability of data packets and the preset recovery probability. It may be understood that the data packets include at least the media packets. Certainly, when the data packets include only the media packets, if the reception probability of data packets is less than the preset recovery probability, FEC redundant packets are to be configured in the data packets. It may be understood that the number of FEC redundant packets in the data packets should be reduced as much as possible on the premise of ensuring that the reception probability of data packets is greater than or equal to the preset recovery probability, that is, the minimum configured number of FEC redundant packets is determined.

S130: Send, to a receiving end, the first target number of media packets and the minimum configured number of FEC redundant packets.

In an embodiment, after the minimum configured number of FEC redundant packets is determined, the minimum configured number of FEC redundant packets are added to the data packets, and the data packets that carry the first target number of media packets and the minimum configured number of FEC redundant packets are sent to the receiving end. Certainly, in order to facilitate the parsing of the FEC redundant packets, the FEC redundant packets are numbered, that is, each FEC redundant packet is configured with a corresponding redundant packet sequence number.

In the technical solution of this embodiment, the minimum configured number of FEC redundant packets is determined based on the maximum number of retransmissions, the preset recovery probability, and the predetermined reception probability of data packets, to obtain a minimum FEC redundancy proportion, thereby implementing a reduction in an FEC redundancy proportion, an increase in the clarity and frame rate of real-time communication, and a reduction in operating costs, while satisfying the requirements of users for the delay and weak network resistance.

Figure 2:
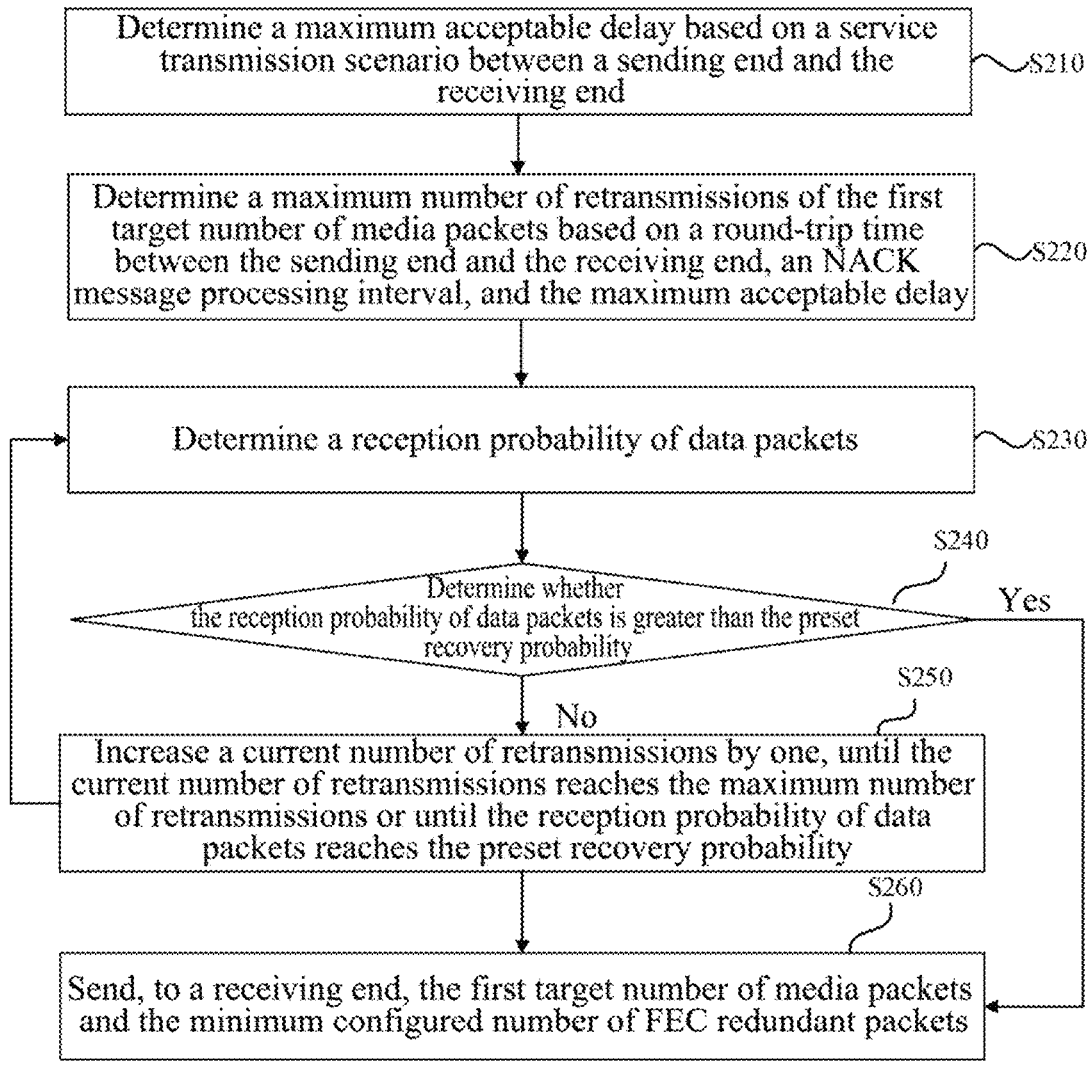
FIG. 2 is a flowchart of another data transmission method according to an embodiment of the present disclosure.

In an embodiment, FIG. 2 is a flowchart of another data transmission method according to an embodiment of the present disclosure. On the basis of the above embodiments, this embodiment illustrates the implementation process of the data transmission method. As shown in FIG. 2, the data transmission method in this embodiment includes the following steps.

S210: Determine a maximum acceptable delay based on a service transmission scenario between a sending end and the receiving end.

The maximum acceptable delay refers to a maximum delay for which the peer end of the sending end or the receiving end does not respond when data is transmitted between the sending end and the receiving end. It should be noted that the peer end may be the sending end, or may be the receiving end. It may be understood that when the sending end sends data to the receiving end, the sending end is the local end and the receiving end is the peer end; and when the receiving end feeds back information to the sending end, the receiving end is the local end and the sending end is the peer end. It may be understood that during the data transmission between the sending end and the receiving end, if the non-response duration reaches the maximum acceptable delay, the receiving end (or the sending end) has not yet responded to the sending end (or the receiving end), it may be understood that there is a communication failure between the sending end and the receiving end. Therefore, the maximum acceptable delay between the sending end and receiving end is configured to ensure the normal communication between the sending end and receiving end. Certainly, the maximum acceptable delay is related to the service transmission scenario between the sending end and the receiving end. For example, as a number of service transmissions between the sending end and the receiving end increases, or a communication distance between the sending end and the receiving end increases, the maximum acceptable delay also increases accordingly. Certainly, the maximum acceptable delay may also be related to other factors, and can thus be adjusted and configured according to actual situations, which is not limited.

S220: Determine a maximum number of retransmissions of the first target number of media packets based on a round-trip time between the sending end and the receiving end, an NACK message processing interval, and the maximum acceptable delay.

The round-trip time between the sending end and the receiving end refers to a total duration of two processes of sending data from the sending end to the receiving end and sending feedback information from the receiving end to the sending end. The NACK message processing interval refers to a time it takes for the receiving end to send an NACK message (that is, a time it takes for the receiving end from determining the need to send the NACK message to actually sending the NACK message). That is, the NACK message processing interval plus the round-trip time may be understood as a total processing duration of the NACK message at one time. In an embodiment, a sum of the round-trip time between the sending end and the receiving end and the NACK message processing interval is first calculated, and then a ratio of the maximum acceptable delay to the sum (that is, the sum of the round-trip time between the sending end and the receiving end and the NACK message processing interval) is calculated, and a value derived from the ratio is used as the maximum number of retransmissions of the first target number of media packets.

It should be noted that the sum of the round-trip time between the sending end and the receiving end and the NACK message processing interval is less than or equal to the maximum acceptable delay. In an embodiment, the maximum acceptable delay is used to ensure that the recovery duration between the sending end and the receiving end is long enough to guarantee normal communication, that is, a sum of total durations of the NACK message for the same data packet at multiple times should be less than or equal to the maximum acceptable delay.

S230: Determine a reception probability of data packets.

It should be noted that the manner of determining the reception probability of data packets when the maximum number of retransmissions at the sending end is 0 is different from the manner of determining the reception probability of data packets when the maximum number of retransmissions at the sending end is not 0.

In one embodiment, the reception probability of data packets is determined in two implementations.

In one implementation, the reception probability of data packets is determined based on a packet loss rate between the sending end and the receiving end. In an embodiment, when the maximum number of retransmissions of data packets is 0, the reception probability of data packets may be directly determined based on the packet loss rate between the sending end and the receiving end.

In one embodiment, when the data packets include media packets or the data packets include media packets and FEC redundant packets, the maximum number of retransmissions is 0, and a number of successfully received data packets is a second target number, determining the reception probability of data packets based on a packet loss rate between the sending end and the receiving end includes: determining a reception probability of the second target number of data packets based on the packet loss rate between the sending end and the receiving end, a total number of data packets, and the second target number.

The second target number refers to the number of successfully received data packets. For example, assuming that the packet loss rate between the sending end and the receiving end is x, the total number of data packets is m, and the second target number is i, the reception probability of the second target number of data packets is:

$$P(m, i) = C_m^i (x)^{m-i} (1-x)^i$$

where P(m, i) represents a reception probability of successfully receiving i data packets out of the m data packets; and x represents the packet loss rate between the sending end and receiving end.

In an embodiment, when the data packets include media packets or the data packets include media packets and FEC redundant packets, the reception probability of successfully receiving i data packets at the receiving end without retransmission is related to the packet loss rate between the sending end and the receiving end.

In the other implementation, the reception probability of data packets is determined based on the packet loss rate between the sending end and the receiving end and the maximum number of retransmissions. In an embodiment, when the maximum number of retransmissions of the data packets is not 0, the reception probability of data packets may be determined based on the packet loss rate between the sending end and the receiving end and the maximum number of retransmissions.

In one embodiment, when the data packets include only media packets and the maximum number of retransmissions is k, and a number of successfully received data packets is a second target number, the determining the reception probability of the second target number of data packets based on the packet loss rate between the sending end and the receiving end and the maximum number of retransmissions includes: determining, based on the packet loss rate between the sending end and the receiving end, a total number of data packets, and a third target number, a reception probability of the third target number of data packets as a first reception probability of data packets, where the first reception probability of data packets is a reception probability of data packets after the first transmission; determining, based on the maximum number of retransmissions, the total number of data packets, and a fourth target number, a reception probability of the fourth target number of data packets as a second reception probability of data packets, where the second reception probability of data packets is a reception probability of data packets after the data packets are transmitted the maximum number of retransmissions; and determining the reception probability of the second target number of data packets based on the maximum number of retransmissions, the first reception probability of data packets, and the second reception probability of data packets, where a sum of the third target number and the fourth target number is the second target number.

The third target number refers to a number of successfully received data packets after the first transmission. The fourth target number refers to a number of successfully received data packets after the data packets are transmitted the maximum number of retransmissions. For example, assuming that the packet loss rate between the sending end and the receiving end is x, the total number of data packets is m, the second target number is i, the third target number is j, the fourth target number is i−j, and the maximum number of retransmissions is k, the reception probability of the second target number of data packets is:

$$P(m, i, k) = \sum_{j=0}^{j}(P(m, j, 0) * P(m - j, i - j, k - 1)),$$

where $P(m, i, k)$ represents the probability of successfully receiving i data packets out of the m data packets for at most k retransmissions; $P(m, j, 0)$ represents the probability of receiving data packets after the first transmission; and $P(m-j, i-j, k-1)$ represents the probability of receiving i−j data packets after k transmissions of the remaining m−j data packets.

In one embodiment, when the data packets include media packets with a maximum number of retransmissions of k and FEC redundant packets with a maximum number of retransmissions of 0, and a number of successfully received media packets is a second target number, the determining the reception probability of data packets based on the packet loss rate between the sending end and the receiving end and the maximum number of retransmissions includes: determining, based on the packet loss rate between the sending end and the receiving end, the first target number, and a third target number, a reception probability of the third target number of media packets as a first reception probability of media packets, where the first reception probability of media packets is a reception probability of media packets after the first transmission; determining, based on the maximum number of retransmissions, the first target number, and a fourth target number, a reception probability of the fourth target number of media packets as a second reception probability of media packets, where the second reception probability of media packets is a reception probability of media packets after the media packets are transmitted the maximum number of retransmissions; determining the reception probability of the second target number of media packets based on the maximum number of retransmissions, the first reception probability of media packets, and the second reception probability of media packets, where a sum of the third target number and the fourth target number is the second target number; determining a reception probability of redundant packets based on the packet loss rate between the sending end and the receiving end, a total number of redundant packets, and a number of successfully received redundant packets; and determining the reception probability of data packets based on the reception probability of media packets and the reception probability of redundant packets.

The third target number refers to a number of successfully received media packets after the first transmission. The fourth target number refers to a number of successfully received media packets after the media packets are transmitted the maximum number of retransmissions. For example, assuming that the packet loss rate between the sending end and the receiving end is x, the total number of media packets is m, the second target number is i, the third target number is j, the fourth target number is i−j, and the maximum number of retransmissions is k, the reception probability of the second target number of media packets is:

$$P(m, i, k) = \sum_{j=0}^{j}(P(m, j, 0) * P(m - j, i - j, k - 1)).$$

Assuming that the total number of redundant packets is n, and the number of successfully received redundant packets is r, the reception probability of redundant packets is: $P(n, r, 0)$; and then, the reception probability of data packets is:

$$\sum_{i+r \geq m} P(m, i, k) P(n, r, 0)$$

where $P(m, i, k)$ is the probability of successfully receiving i data packets out of the m data packets for at most k retransmissions; and $P(n, r, 0)$ represents the probability of successfully receiving r FEC redundant packets out of n FEC redundant packets.

S240: Determine whether the reception probability of data packets is greater than the preset recovery probability. In response to the reception probability of data packets being less than the preset recovery probability, the process proceeds to S250; and in response to the reception probability of data packets being greater than or equal to the preset recovery probability, the process proceeds to S260.

S250: Increase a current number of retransmissions by one, and return to S230, until the current number of retransmissions reaches the maximum number of retransmissions or until the reception probability of data packets is greater than or equal to the preset recovery probability.

In an embodiment, the reception probability of data packets when the current number of retransmissions is 0 and the data packets include only media packets is first determined. If the reception probability of data packets does not reach the preset recovery probability, the current number of retransmissions is increased by one, to determine the reception probability of data packets when the current number of retransmissions is 1 and the data packets include only media packets. At this time, if the reception probability of data packets has not yet reached the preset recovery probability, the current number of retransmissions is further increased by one and the reception probability of data packets is re-determined, until the current number of retransmissions reaches the maximum number of retransmissions or until the reception probability of data packets reaches the preset recovery probability. Certainly, if the reception probability of data packets has not yet reached the preset recovery probability when the current number of retransmissions reaches the maximum number of retransmissions, one FEC redundant packet is configured in the data packets, that is, the data packets include the first target number of media packets and one FEC redundant packet, the media packets are retransmitted and the FEC redundant packet is not retransmitted, and the reception probability of data packets in this case is calculated. If the reception probability of data packets has not yet reached the preset recovery probability, the configured number of FEC redundant packets in the data packets is increased by one, and the reception probability of data packets is recalculated, until the reception probability of data packets reaches the preset recovery probability. The configured number of FEC redundant packets included in the data packets at this point is used as the minimum configured number.

S260: Send, to a receiving end, the first target number of media packets and the minimum configured number of FEC redundant packets.

On the basis of the above embodiments, the technical solution of this embodiment enables the minimum configured number of FEC redundant packets to be determined by calculating the reception probability of data packets in different scenarios, to ensure that the FEC redundancy proportion is minimized, thereby implementing a reduction in the FEC redundancy proportion, an increase in the clarity and frame rate of real-time communication, and a reduction in operating costs, while satisfying the requirements of users for the delay and weak network resistance.

In one embodiment, the data transmission method further includes: determining a minimum redundancy proportion based on the minimum configured number of FEC redundant packets and the first target number. In an embodiment, a ratio of the minimum configured number of FEC redundant packets to the first target number is determined, and the ratio is used as the minimum redundancy proportion. It may be understood that when the number of FEC redundant packets included in the data packets can ensure that the reception probability of data packets reaches the preset recovery probability, the number of FEC redundant packets is used as the minimum configured number, and then the corresponding minimum redundancy proportion can be derived from the minimum configured number, thereby implementing a reduction in the FEC redundancy proportion, an increase in the clarity and frame rate of real-time communication, and a reduction in operating costs, while satisfying the requirements of users for the delay and weak network resistance.

In one embodiment, assuming that there are m media packets and n FEC redundant packets that need to be sent, the maximum number of retransmissions is k, the packet loss rate between the sending end and the receiving end is x, and the preset recovery probability is s, the calculation of the minimum redundancy proportion includes the following steps.

First, assuming that there are m media packets that need to be sent, and the packet loss rate is x, the probability of receiving exactly i (0<=1<=m) media packets at the peer end without retransmission is: $P(m, i)=C_m^i(x)^{m-i}(1-x)^i$.

Then, assuming that m media packets can be retransmitted k times at most, the probability of receiving exactly i (0<=i<=m) media packets at the peer end is:

$$P(m, i, k) = \sum_{j=0}^{i}(P(m, j, 0) * P(m-j, i-j, k-1)),$$

where P(m, i, k) represents the probability of successfully receiving i media packets out of the m media packets for at most k retransmissions; P(m, j, 0) represents the probability of receiving j media packets after the first transmission; and P(m−j, i−j, k−1) represents the probability of receiving i−j media packets after k transmissions of the remaining m−j media packets. The value of P(m, j, 0) can be calculated according to $P(m, j)=C_m^j(x)^{m-j}(1-x)^j$, that is, P(m, j, 0)=P(m, j), which mat then be added up to obtain P(m, i, k).

The computational complexity of this calculation method is O(m*m*k). Generally, the grouping of a set of media packets m (m being the number of media packets) and the maximum number of retransmissions k have small values, and can thus be calculated quickly.

Then, for m media packets and n FEC redundant packets, if the FEC redundant packets are not retransmitted, and an allowed maximum number of retransmissions of the media packets is k, the probability of receiving exactly i data packets out of m media packets is P(m, i, k), and the probability of receiving r FEC redundant packets out of n FEC redundant packets is P(n, r, 0), the reception probability of data packets at the peer end is:

$$\sum_{i+r \geq m} P(m, i, k)P(n, r, 0)$$

Finally, assuming that it takes N milliseconds for an encoding side to generate m media packets, and the recovery probability at the peer end needs to reach s, for example, assuming that it takes N milliseconds for the sending end to generate n FEC redundant packets for m media packets, and the recovery probability at the peer end needs to reach s, the maximum acceptable delay is delay, and rtt is the round-trip time between the sending end and the receiving end, the minimum redundancy proportion f can be calculated as: f=min(n/m), where the calculation formula of f needs to meet the following conditions.

$$\sum_{\substack{i+r \geq m \\ N+k*rtt \leq delay}} P(m, i, k)P(n, r, 0) \geq s$$

In one embodiment, it is assumed that the packet loss rate between the sending end and the receiving end is configured to be a 50% random packet loss according to a user's current network condition, the round-trip time rtt between the sending end and the receiving end is 80 ms, the NACK message processing interval is 20 ms, the allowed maximum acceptable delay for a service is 100 ms, the preset recovery probability equals to 0.75, and 2 media packets are used for FEC grouping. For ease of calculation, it is assumed that FEC encoding takes no time.

First, the maximum number of retransmissions is calculated, that is, K=100 ms/(80 ms+20 ms)=1.

Then, sequentially, when two media packets are retransmitted 0 time, the probability of receiving no media packet can be calculated as 0.25, the probability of receiving one media packet can be calculated as 0.5, and the probability of receiving two media packets can be calculated as 0.25; and when the two media packets are retransmitted 1 time, the probability of receiving no media packet can be calculated as 0.0625, the probability of receiving one media packet can be calculated as 0.375, and the probability of receiving two media packets can be calculated as 0.5625. Therefore, the absence of FEC redundant packets in the data packets does not conform to requirements.

Assuming that there is one FEC redundant packet and the FEC redundant packet is retransmitted once, the probability of receiving no arbitrary packet is 0.03125, the probability of receiving one arbitrary packet is 0.21875, and the probability of receiving two or more packets is 0.75, which just conforms to requirements.

On this basis, it can be concluded that the minimum configured number of FEC redundant packets for a set of media packets to meet requirements in this environment is 1.

It should be noted that the calculation formula of the reception probability of data packets in the embodiment of the present disclosure is based on a random packet loss model, which ensures that the peer end may be able to receive or reply to each media packet with a high probability in this network environment. For the lost media packet, retransmission can be performed for recovery. The probability that the peer end can recover all media packets under specific FEC redundant packets and a specific number of retransmissions can be calculated through the calculation formula of the reception probability of data packets in the above embodiment.

Figure 3:
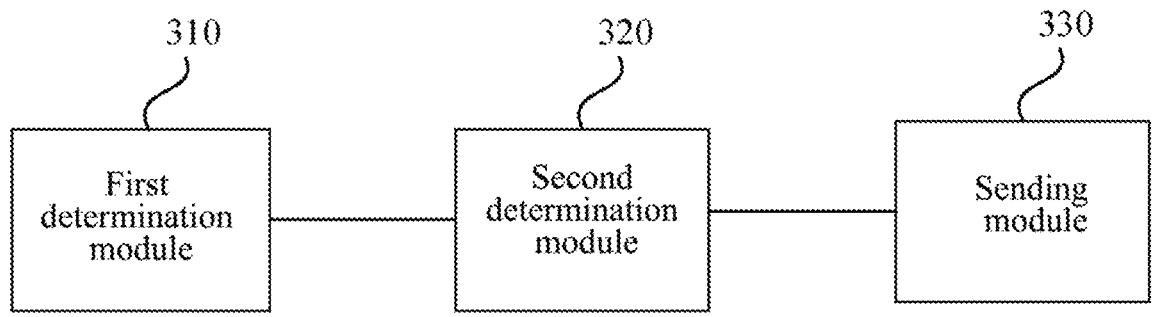
FIG. 3 is a block diagram of a structure of a data transmission apparatus according to an embodiment of the present disclosure.

In one embodiment, FIG. 3 is a block diagram of a structure of a data transmission apparatus according to an embodiment of the present disclosure. As shown in FIG. 3, the data transmission apparatus in this embodiment includes: a first determination module 310, a second determination module 320, and a sending module 330.

The first determination module 310 is configured to determine a maximum number of retransmissions of a first target number of media packets.

The second determination module 320 is configured to determine a minimum configured number of FEC redundant packets based on the maximum number of retransmissions, a preset recovery probability, and a predetermined reception probability of data packets.

The sending module 330 is configured to send, to a receiving end, the first target number of media packets and the minimum configured number of FEC redundant packets.

In the technical solution of this embodiment, the minimum configured number of FEC redundant packets is determined based on the maximum number of retransmissions, the preset recovery probability, and the predetermined reception probability of data packets, to obtain a minimum FEC redundancy proportion, thereby implementing a reduction in an FEC redundancy proportion, an increase in the clarity and frame rate of real-time communication, and a reduction in operating costs, while satisfying the requirements of users for the delay and weak network resistance.

In one embodiment, the first determination module 310 includes:
a first determination unit configured to determine a maximum acceptable delay based on a service transmission scenario between a sending end and the receiving end; and
a second determination unit configured to determine the maximum number of retransmissions of the first target number of media packets based on a round-trip time between the sending end and the receiving end, a non-acknowledge (NACK) message processing interval, and the maximum acceptable delay.

In one embodiment, the second determination module 320 includes:
a third determination unit configured to determine the reception probability of data packets when a current number of retransmissions is 0;
a fourth determination unit configured to determine whether the reception probability of data packets is greater than the preset recovery probability; and
an execution unit configured to, in response to the reception probability of data packets being less than the preset recovery probability, increase the current number of retransmissions by one and return to the step of determining the reception probability of data packets, until the current number of retransmissions reaches the maximum number of retransmissions or until the reception probability of data packets is greater than or equal to the preset recovery probability.

In one embodiment, the third determination unit is configured to perform one of the following operations:
determining the reception probability of data packets based on a packet loss rate between a sending end and the receiving end; and
determining the reception probability of data packets based on the packet loss rate between the sending end and the receiving end and the maximum number of retransmissions.

In one embodiment, when the data packets include media packets or the data packets include media packets and FEC redundant packets, the maximum number of retransmissions is 0, and a number of successfully received data packets is a second target number, the determining the reception probability of data packets based on a packet loss rate between a sending end and the receiving end includes:
determining the reception probability of data packets based on the packet loss rate between the sending end and the receiving end, a total number of data packets, and the second target number.

In one embodiment, when the data packets include media packets, the maximum number of retransmissions is k, and a number of successfully received data packets is a second target number, the determining the reception probability of data packets based on the packet loss rate between the sending end and the receiving end and the maximum number of retransmissions includes:
determining, based on the packet loss rate between the sending end and the receiving end, a total number of data packets, and a third target number, a reception probability of the third target number of data packets as a first reception probability of data packets, where the first reception probability of data packets is a reception probability of data packets after one transmission;
determining, based on the maximum number of retransmissions, the total number of data packets, and a fourth target number, a reception probability of the fourth target number of data packets as a second reception probability of data packets, where the second reception probability of data packets is a reception probability of data packets after the maximum number of retransmissions minus one transmission; and
determining the reception probability of data packets based on the maximum number of retransmissions, the first reception probability of data packets, and the second reception probability of data packets, where a sum of the third target number and the fourth target number is the second target number.

In one embodiment, when the data packets include media packets with a maximum number of retransmissions of k and FEC redundant packets with a maximum number of retransmissions of 0, and a number of successfully received data packets is a second target number, the determining the reception probability of data packets based on the packet loss rate between the sending end and the receiving end and the maximum number of retransmissions includes:

determining, based on the packet loss rate between the sending end and the receiving end, the first target number, and a third target number, a reception probability of the third target number of media packets as a first reception probability of media packets, where the first reception probability of media packets is a reception probability of media packets after one transmission;

determining, based on the maximum number of retransmissions, the first target number, and a fourth target number, a reception probability of the fourth target number of media packets as a second reception probability of media packets, where the second reception probability of media packets is a reception probability of media packets after the maximum number of retransmissions minus one transmission;

determining the reception probability of the second target number of media packets based on the maximum number of retransmissions, the first reception probability of media packets, and the second reception probability of media packets, where a sum of the third target number and the fourth target number is the second target number; determining a reception probability of redundant packets based on the packet loss rate between the sending end and the receiving end, a total number of redundant packets, and a number of successfully received redundant packets; and determining the reception probability of data packets based on the reception probability of media packets and the reception probability of redundant packets.

In one embodiment, the data transmission apparatus further includes:

a third determination module configured to determine a minimum redundancy proportion based on the minimum configured number of FEC redundant packets and the first target number.

In one embodiment, a sum of the round-trip time between the sending end and the receiving end and the NACK message processing interval is less than or equal to the maximum acceptable delay.

The above data transmission apparatus can perform the data transmission method provided in any embodiment of the present disclosure, and has corresponding functional modules for performing the method.

Figure 4:
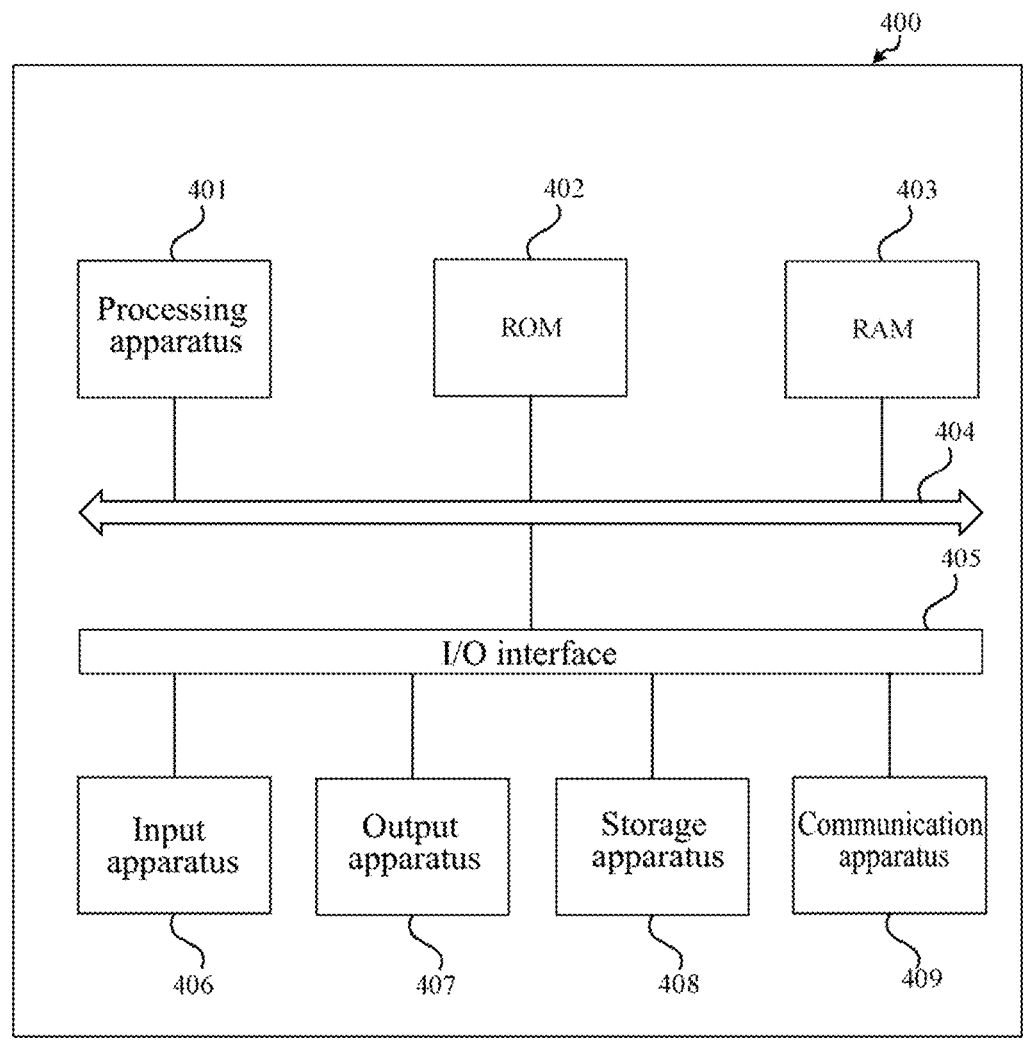
FIG. 4 is a block diagram of a structure of an electronic device according to an embodiment of the present disclosure.

In one embodiment, FIG. 4 is a block diagram of a structure of an electronic device according to an embodiment of the present disclosure. FIG. 4 is a schematic diagram of a structure of an electronic device (e.g., a terminal device, a server, or a computer) 400 suitable for implementing the embodiments of the present disclosure. The computer in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital television (TV) and a desktop computer. The electronic device shown in FIG. 4 is merely an example, and shall not impose any limitation on the function and scope of use of the embodiments of the present disclosure.

As shown in FIG. 4, the electronic device 400 may include a processing apparatus (e.g., a central processor, a graphics processor, etc.) 401 that may perform a variety of appropriate actions and processing in accordance with a program stored in a read-only memory (ROM) 402 or a program loaded from a storage apparatus 406 into a random access memory (RAM) 403. The RAM 403 further stores various programs and data required for the operation of the electronic device 400. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, for example, a touch screen, a touchpad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 406 including, for example, a tape, a hard disk, etc.; and a communication apparatus 409. The communication apparatus 409 may allow the electronic device 400 to perform wireless or wired communication with other devices to exchange data. Although FIG. 4 shows the electronic device 400 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network through the communication apparatus 409, or installed from the storage apparatus 406, or installed from the ROM 402. When the computer program is executed by the processing apparatus 401, the above-mentioned functions defined in the method of the embodiment of the present disclosure are performed.

It should be noted that the above computer-readable medium described in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having at least one wire, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server can communicate using any currently known or future-developed network protocol such as a HyperText Transfer Protocol (HTTP), and can be connected to digital data communication (for example, communication network) in any form or medium. Examples of the communication network include a local area network (LAN), a wide area network (WAN), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries at least one program that, when executed by the electronic device, causes the electronic device to: determine a maximum number of retransmissions of a first target number of media packets; determine a minimum configured number of FEC redundant packets based on the maximum number of retransmissions, a preset recovery probability, and a predetermined reception probability of data packets; and send, to a receiving end, the first target number of media packets and the minimum configured number of FEC redundant packets.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains at least one executable instruction for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. Names of the units do not constitute a limitation on the units themselves in some cases, for example, a first obtaining unit may alternatively be described as "a unit for obtaining at least two Internet Protocol addresses".

The functions described herein above may be performed at least partially by at least one hardware logic component. For example, without limitation, exemplary types of hardware logic components that may be used include: a field programmable gate array (FPGA), an application specific integrated circuit (ASIC), an application specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. A machine-readable medium may be a machine-readable signal medium or a machine-readable storage medium. A machine-readable medium may include, but is not limited to, electronic, magnetic, optical, electromagnetic, infrared, or semiconductor systems, apparatus, or devices, or any suitable combination thereof. More specific examples of a machine-readable storage medium may include an electrical connection based on at least one wire, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to at least one embodiment of the present disclosure, Example 1 provides a data transmission method. The data transmission method includes: determining a maximum number of retransmissions of a first target number of media packets;
  determining a minimum configured number of FEC redundant packets based on the maximum number of retransmissions, a preset recovery probability, and a predetermined reception probability of data packets; and
  sending, to a receiving end, the first target number of media packets and the minimum configured number of FEC redundant packets.

According to at least one embodiment of the present disclosure, Example 2 is the method according to Example 1, where the determining a maximum number of retransmissions of a first target number of media packets includes:
  determining a maximum acceptable delay based on a service transmission scenario between a sending end and the receiving end; and
  determining the maximum number of retransmissions of the first target number of media packets based on a round-trip time between the sending end and the receiving end, a non-acknowledge (NACK) message processing interval, and the maximum acceptable delay.

According to at least one embodiment of the present disclosure, Example 3 is the method according to Example 1, where the determining a minimum configured number of FEC redundant packets based on the maximum number of retransmissions, a preset recovery probability, and a predetermined reception probability of data packets includes:
  determining the reception probability of data packets when a current number of retransmissions is 0;
  determining whether the reception probability of data packets is greater than the preset recovery probability; and
  in response to the reception probability of data packets being less than the preset recovery probability, increasing the current number of retransmissions by one and returning to the step of determining the reception probability of data packets, until the current number of retransmissions reaches the maximum number of retransmissions or until the reception probability of data packets is greater than or equal to the preset recovery probability.

According to at least one embodiment of the present disclosure, Example 4 is the method according to Example 3, where the determining the reception probability of data packets includes one of the following operations:
  determining the reception probability of data packets based on a packet loss rate between a sending end and the receiving end; and
  determining the reception probability of data packets based on the packet loss rate between the sending end and the receiving end and the maximum number of retransmissions.

According to at least one embodiment of the present disclosure, Example 5 is the method according to Example 4, where when the data packets include media packets or the data packets include media packets and FEC redundant packets, the maximum number of retransmissions is 0, and a number of successfully received data packets is a second target number, the determining the reception probability of data packets based on a packet loss rate between a sending end and the receiving end includes:
  determining the reception probability of data packets based on the packet loss rate between the sending end and the receiving end, a total number of data packets, and the second target number.

According to at least one embodiment of the present disclosure, Example 6 is the method according to Example 4, where when the data packets include media packets, the maximum number of retransmissions is k, and a number of successfully received data packets is a second target number, the determining the reception probability of data packets based on the packet loss rate between the sending end and the receiving end and the maximum number of retransmissions includes:
  determining, based on the packet loss rate between the sending end and the receiving end, a total number of data packets, and a third target number, a reception probability of the third target number of data packets as a first reception probability of data packets, where the first reception probability of data packets is a reception probability of data packets after one transmission;
  determining, based on the maximum number of retransmissions, the total number of data packets, and a fourth target number, a reception probability of the fourth target number of data packets as a second reception probability of data packets, where the second reception probability of data packets is a reception probability of data packets after the maximum number of retransmissions minus one transmission; and
  determining the reception probability of data packets based on the maximum number of retransmissions, the first reception probability of data packets, and the second reception probability of data packets, where a sum of the third target number and the fourth target number is the second target number.

According to at least one embodiment of the present disclosure, Example 7 is the method according to Example 4, where when the data packets include media packets with a maximum number of retransmissions of k and FEC redundant packets with a maximum number of retransmissions of 0, and a number of successfully received media packets is a second target number, the determining the reception probability of data packets based on the packet loss rate between the sending end and the receiving end and the maximum number of retransmissions includes:
  determining, based on the packet loss rate between the sending end and the receiving end, the first target number, and a third target number, a reception probability of the third target number of media packets as a first reception probability of media packets, where the first reception probability of media packets is a reception probability of media packets after one transmission;
  determining, based on the maximum number of retransmissions, the first target number, and a fourth target number, a reception probability of the fourth target number of media packets as a second reception probability of media packets, where the second reception probability of media packets is a reception probability of media packets after the maximum number of retransmissions minus one transmission;
  determining the reception probability of the second target number of media packets based on the maximum number of retransmissions, the first reception probability of media packets, and the second reception probability of media packets, where a sum of the third target number and the fourth target number is the second target number; determining a reception probability of redundant packets based on the packet loss rate between the sending end and the receiving end, a total number of redundant packets, and a number of successfully received redundant packets; and
  determining the reception probability of data packets based on the reception probability of media packets and the reception probability of redundant packets.

According to at least one embodiment of the present disclosure, Example 8 is the method according to Example 1, where the method further includes: determining a minimum redundancy proportion based on the minimum configured number of FEC redundant packets and the first target number.

According to at least one embodiment of the present disclosure, Example 9 is the method according to Example 2, where a sum of the round-trip time between the sending end and the receiving end and the NACK message processing interval is less than or equal to the maximum acceptable delay.

According to at least one embodiment of the present disclosure, Example 10 provides a data transmission apparatus. The data transmission apparatus includes:
  a first determination module configured to determine a maximum number of retransmissions of a first target number of media packets;

a second determination module configured to determine a minimum configured number of FEC redundant packets based on the maximum number of retransmissions, a preset recovery probability, and a predetermined reception probability of data packets; and a sending module configured to send, to a receiving end, the first target number of media packets and the minimum configured number of FEC redundant packets.

According to at least one embodiment of the present disclosure, Example 11 provides an electronic device. The electronic device includes:

at least one processor; and a memory configured to store at least one program, where the at least one program, when executed by the at least one processor, causes the at least one processor to implement the data transmission method according to any one of Examples 1 to 9.

According to at least one embodiment of the present disclosure, Example 12 provides a computer storage medium storing a computer program that, when executed by a processor, causes the data transmission method according to any one of Examples 1 to 9 to be implemented.

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A data transmission method, comprising:
   determining a maximum number of retransmissions of a first target number of media packets;
   determining a minimum configured number of forward error correction (FEC) redundant packets based on the maximum number of retransmissions, a preset recovery probability, and a predetermined reception probability of data packets; and
   sending, to a receiving end, the first target number of media packets and the minimum configured number of FEC redundant packets;
   wherein the determining a maximum number of retransmissions of a first target number of media packets comprises:
   determining a maximum acceptable delay based on a service transmission scenario between a sending end and the receiving end; and
   determining the maximum number of retransmissions of the first target number of media packets based on a round-trip time between the sending end and the receiving end, a non-acknowledge (NACK) message processing interval, and the maximum acceptable delay;
   wherein a sum of the round-trip time between the sending end and the receiving end and the NACK message processing interval is less than or equal to the maximum acceptable delay.

2. The method according to claim 1, wherein the determining a minimum configured number of FEC redundant packets based on the maximum number of retransmissions, a preset recovery probability, and a predetermined reception probability of data packets comprises:
   determining the reception probability of data packets in response to a current number of retransmissions being 0;
   determining whether the reception probability of data packets is greater than the preset recovery probability; and
   in response to the reception probability of data packets being less than the preset recovery probability, increasing the current number of retransmissions by one and returning to the step of determining the reception probability of data packets, until the current number of retransmissions reaches the maximum number of retransmissions or until the reception probability of data packets is greater than or equal to the preset recovery probability.

3. The method according to claim 2, wherein the determining the reception probability of data packets comprises one of the following operations:
   determining the reception probability of data packets based on a packet loss rate between a sending end and the receiving end; and
   determining the reception probability of data packets based on the packet loss rate between the sending end and the receiving end and the maximum number of retransmissions.

4. The method according to claim 3, wherein when the data packets comprise media packets or the data packets comprise media packets and FEC redundant packets, the maximum number of retransmissions is 0, and a number of successfully received data packets is a second target number, the determining the reception probability of data packets based on a packet loss rate between a sending end and the receiving end comprises:
   determining the reception probability of data packets based on the packet loss rate between the sending end and the receiving end, a total number of data packets, and the second target number.

5. The method according to claim 3, wherein when the data packets comprise media packets, the maximum number of retransmissions is k, and a number of successfully received data packets is a second target number, the determining the reception probability of data packets based on the packet loss rate between the sending end and the receiving end and the maximum number of retransmissions comprises:
   determining, based on the packet loss rate between the sending end and the receiving end, a total number of data packets, and a third target number, a reception probability of the third target number of data packets as a first reception probability of data packets, wherein the first reception probability of data packets is a reception probability of data packets after one transmission;
   determining, based on the maximum number of retransmissions, the total number of data packets, and a fourth target number, a reception probability of the fourth target number of data packets as a second reception probability of data packets, wherein the second reception probability of data packets is a reception probability of data packets after the maximum number of retransmissions minus one transmission; and determining the reception probability of data packets based on the maximum number of retransmissions, the first reception probability of data packets, and the second reception probability of data packets, wherein a sum of the third target number and the fourth target number is the second target number.

6. The method according to claim 3, wherein when the data packets comprise media packets with a maximum number of retransmissions of k and FEC redundant packets with a maximum number of retransmissions of 0, and a number of successfully received media packets is a second target number, the determining the reception probability of data packets based on the packet loss rate between the sending end and the receiving end and the maximum number of retransmissions comprises:

determining, based on the packet loss rate between the sending end and the receiving end, the first target number, and a third target number, a reception probability of the third target number of media packets as a first reception probability of media packets, wherein the first reception probability of media packets is a reception probability of media packets after one transmission;

determining, based on the maximum number of retransmissions, the first target number, and a fourth target number, a reception probability of the fourth target number of media packets as a second reception probability of media packets, wherein the second reception probability of media packets is a reception probability of media packets after the maximum number of retransmissions minus one transmission;

determining the reception probability of the second target number of media packets based on the maximum number of retransmissions, the first reception probability of media packets, and the second reception probability of media packets, wherein a sum of the third target number and the fourth target number is the second target number;

determining a reception probability of redundant packets based on the packet loss rate between the sending end and the receiving end, a total number of redundant packets, and a number of successfully received redundant packets; and determining the reception probability of data packets based on the reception probability of media packets and the reception probability of redundant packets.

7. The method according to claim 1, further comprising:
determining a minimum redundancy proportion based on the minimum configured number of FEC redundant packets and the first target number.

8. An electronic device, comprising:
at least one processor; and
a memory configured to store at least one program, wherein
the at least one program, when executed by the at least one processor, causes the at least one processor to:
determine a maximum number of retransmissions of a first target number of media packets;
determine a minimum configured number of forward error correction (FEC) redundant packets based on the maximum number of retransmissions, a preset recovery probability, and a predetermined reception probability of data packets; and send, to a receiving end, the first target number of media packets and the minimum configured number of FEC redundant packets;

wherein determining a maximum number of retransmissions of a first target number of media packets comprises:
determining a maximum acceptable delay based on a service transmission scenario between a sending end and the receiving end; and
determining the maximum number of retransmissions of the first target number of media packets based on a round-trip time between the sending end and the receiving end, a non-acknowledge (NACK) message processing interval, and the maximum acceptable delay;
wherein a sum of the round-trip time between the sending end and the receiving end and the NACK message processing interval is less than or equal to the maximum acceptable delay.

9. A non-transitory computer storage medium storing a computer program that, when executed by a processor, causes the processor to:
determine a maximum number of retransmissions of a first target number of media packets;
determine a minimum configured number of forward error correction (FEC) redundant packets based on the maximum number of retransmissions, a preset recovery probability, and a predetermined reception probability of data packets; and
send, to a receiving end, the first target number of media packets and the minimum configured number of FEC redundant packets;
wherein determining a maximum number of retransmissions of a first target number of media packets comprises:
determining a maximum acceptable delay based on a service transmission scenario between a sending end and the receiving end; and
determining the maximum number of retransmissions of the first target number of media packets based on a round-trip time between the sending end and the receiving end, a non-acknowledge (NACK) message processing interval, and the maximum acceptable delay;
wherein a sum of the round-trip time between the sending end and the receiving end and the NACK message processing interval is less than or equal to the maximum acceptable delay.

10. The electronic device according to claim 8, wherein the electronic device is caused to determining a maximum number of retransmissions of a first target number of media packets by:
determining a maximum acceptable delay based on a service transmission scenario between a sending end and the receiving end; and
determining the maximum number of retransmissions of the first target number of media packets based on a round-trip time between the sending end and the receiving end, a non-acknowledge (NACK) message processing interval, and the maximum acceptable delay.

11. The electronic device according to claim 8, wherein the electronic device is caused to determine a minimum configured number of FEC redundant packets based on the maximum number of retransmissions, a preset recovery probability, and a predetermined reception probability of data packets by:
determining the reception probability of data packets in response to a current number of retransmissions being 0;

determining whether the reception probability of data packets is greater than the preset recovery probability; and in response to the reception probability of data packets being less than the preset recovery probability, increasing the current number of retransmissions by one and returning to the step of determining the reception probability of data packets, until the current number of retransmissions reaches the maximum number of retransmissions or until the reception probability of data packets is greater than or equal to the preset recovery probability.

12. The electronic device according to claim 11, wherein the electronic device is caused to determine the reception probability of data packets by one of the following operations:

determining the reception probability of data packets based on a packet loss rate between a sending end and the receiving end; and determine the reception probability of data packets based on the packet loss rate between the sending end and the receiving end and the maximum number of retransmissions.

13. The electronic device according to claim 12, wherein when the data packets comprise media packets or the data packets comprise media packets and FEC redundant packets, the maximum number of retransmissions is 0, and a number of successfully received data packets is a second target number, the electronic device is caused to determine the reception probability of data packets based on a packet loss rate between a sending end and the receiving end by:

determining the reception probability of data packets based on the packet loss rate between the sending end and the receiving end, a total number of data packets, and the second target number.

14. The electronic device according to claim 12, wherein when the data packets comprise media packets, the maximum number of retransmissions is k, and a number of successfully received data packets is a second target number, the electronic device is caused to determine the reception probability of data packets based on the packet loss rate between the sending end and the receiving end and the maximum number of retransmissions by:

determining, based on the packet loss rate between the sending end and the receiving end, a total number of data packets, and a third target number, a reception probability of the third target number of data packets as a first reception probability of data packets, wherein the first reception probability of data packets is a reception probability of data packets after one transmission;

determining, based on the maximum number of retransmissions, the total number of data packets, and a fourth target number, a reception probability of the fourth target number of data packets as a second reception probability of data packets, wherein the second reception probability of data packets is a reception probability of data packets after the maximum number of retransmissions minus one transmission; and determining the reception probability of data packets based on the maximum number of retransmissions, the first reception probability of data packets, and the second reception probability of data packets, wherein a sum of the third target number and the fourth target number is the second target number.

15. The electronic device according to claim 12, wherein when the data packets comprise media packets with a maximum number of retransmissions of k and FEC redundant packets with a maximum number of retransmissions of 0, and a number of successfully received media packets is a second target number, the electronic device is caused to determine the reception probability of data packets based on the packet loss rate between the sending end and the receiving end and the maximum number of retransmissions by:

determining, based on the packet loss rate between the sending end and the receiving end, the first target number, and a third target number, a reception probability of the third target number of media packets as a first reception probability of media packets, wherein the first reception probability of media packets is a reception probability of media packets after one transmission;

determining, based on the maximum number of retransmissions, the first target number, and a fourth target number, a reception probability of the fourth target number of media packets as a second reception probability of media packets, wherein the second reception probability of media packets is a reception probability of media packets after the maximum number of retransmissions minus one transmission;

determining the reception probability of the second target number of media packets based on the maximum number of retransmissions, the first reception probability of media packets, and the second reception probability of media packets, wherein a sum of the third target number and the fourth target number is the second target number;

determining a reception probability of redundant packets based on the packet loss rate between the sending end and the receiving end, a total number of redundant packets, and a number of successfully received redundant packets; and determining the reception probability of data packets based on the reception probability of media packets and the reception probability of redundant packets.

16. The electronic device according to claim 8, the electronic device is further caused to:

determine a minimum redundancy proportion based on the minimum configured number of FEC redundant packets and the first target number.

17. The electronic device according to claim 10, wherein a sum of the round-trip time between the sending end and the receiving end and the NACK message processing interval is less than or equal to the maximum acceptable delay.

18. The computer storage medium according to claim 9, wherein the processor is further caused to determine a maximum number of retransmissions of a first target number of media packets comprises:

determining a maximum acceptable delay based on a service transmission scenario between a sending end and the receiving end; and determining the maximum number of retransmissions of the first target number of media packets based on a round-trip time between the sending end and the receiving end, a non-acknowledge (NACK) message processing interval, and the maximum acceptable delay.

* * * * *